United States Patent
Gunjan

(10) Patent No.: US 9,842,301 B2
(45) Date of Patent: Dec. 12, 2017

(54) SYSTEMS AND METHODS FOR IMPROVED KNOWLEDGE MINING

(71) Applicant: Abhishek Gunjan, Gaya (IN)

(72) Inventor: Abhishek Gunjan, Gaya (IN)

(73) Assignee: WIPRO LIMITED, Bangalore (IN)

(*) Notice: Subject to any disclaimer, the term of this patent is extended or adjusted under 35 U.S.C. 154(b) by 405 days.

(21) Appl. No.: 14/747,922

(22) Filed: Jun. 23, 2015

(65) Prior Publication Data

US 2016/0275152 A1    Sep. 22, 2016

(30) Foreign Application Priority Data

Mar. 20, 2015 (IN) ............ 1424/CHE/2015

(51) Int. Cl.
*G06F 17/00* (2006.01)
*G06N 5/02* (2006.01)
(Continued)

(52) U.S. Cl.
CPC ....... *G06N 99/005* (2013.01); *G06F 17/2785* (2013.01); *G06F 17/3071* (2013.01);
(Continued)

(58) Field of Classification Search
USPC .......................................... 706/48
See application file for complete search history.

(56) References Cited

U.S. PATENT DOCUMENTS 8,010,545 B2    8/2011    Stefik et al.
8,095,489 B2    1/2012    Chen et al.
(Continued)

OTHER PUBLICATIONS

Incrementally Learning Objects by Touch: Online Discriminative and Generative Models for Tactile-Based Recognition Harold Soh; Yiannis Demiris IEEE Transactions on Haptics Year: 2014, vol: 7, Issue: 4 pp. 512-525 IEEE Journals & Magazines.*
(Continued)

*Primary Examiner* — Michael B Holmes
(74) *Attorney, Agent, or Firm* — Finnegan, Henderson, Farabow, Garrett & Dunner LLP

(57) ABSTRACT

This disclosure relates to systems and methods for improved knowledge mining. In one embodiment, a method is disclosed, which comprises filtering aggregated data encoded according to multiple data formats, using a combination of sliding-window and boundary-based filtration techniques. Machine learning and natural language processing are applied to the filtered data to generate a business ontology. Also, using a prediction analysis, one or more recommended classification techniques are automatically identified. The filtered data is clustered into an automatically determined number of categories based on the automatically recommended one or more classification techniques. The one or more classification techniques may utilize iterative feedback between a supervised learning technique and an unsupervised learning technique. Furthermore, the method includes generating automatically correlations between the business ontology and the automatically determined number of categories, and generating a knowledge base using the correlations between the business ontology and the automatically determined number of categories.

20 Claims, 10 Drawing Sheets

(51) Int. Cl.
*G06N 99/00* (2010.01)
*G06F 17/27* (2006.01)
*G06F 17/30* (2006.01)

(52) U.S. Cl.
CPC ......... *G06F 17/30734* (2013.01); *G06N 5/02* (2013.01); *G06N 5/022* (2013.01)

(56) References Cited

U.S. PATENT DOCUMENTS

| | | | |
|---|---|---|---|
| 8,549,016 B2 | 10/2013 | Stefik et al. | |
| 8,595,245 B2* | 11/2013 | Cavestro | G06F 17/30014 |
| | | | 707/758 |
| 8,671,104 B2 | 3/2014 | Stefik et al. | |
| 9,449,221 B2* | 9/2016 | Gunjan | G06K 9/00362 |
| 9,449,287 B2* | 9/2016 | Gunjan | G06N 99/005 |
| 9,454,782 B2* | 9/2016 | Gunjan | G06Q 30/0631 |
| 9,465,831 B2* | 10/2016 | Gunjan | G06F 17/30333 |
| 2005/0131935 A1 | 6/2005 | O'Leary et al. | |
| 2012/0191716 A1 | 7/2012 | Omoigui | |
| 2014/0188462 A1 | 7/2014 | Zadeh | |
| 2015/0278590 A1* | 10/2015 | Gunjan | G06K 9/00362 |
| | | | 382/107 |
| 2015/0310344 A1* | 10/2015 | Gunjan | G06N 99/005 |
| | | | 706/52 |
| 2016/0005056 A1* | 1/2016 | Gunjan | G06Q 30/0202 |
| | | | 705/7.31 |
| 2016/0019249 A1* | 1/2016 | Gunjan | G06F 17/30333 |
| | | | 707/715 |
| 2016/0086250 A1* | 3/2016 | Gunjan | G06Q 30/0631 |
| | | | 705/26.7 |
| 2016/0132969 A1* | 5/2016 | Gunjan | G06Q 40/08 |
| | | | 705/4 |
| 2016/0267231 A1* | 9/2016 | Gunjan | G06F 19/328 |

OTHER PUBLICATIONS

A survey on sentiment analysis methods and approach A. M. Abirami; V. Gayathri 2016 Eighth International Conference on Advanced Computing (ICoAC) Year: 2017 pp. 72-76 IEEE Conference Publications.*

Attributes Scaling for K-means Algorithm Controlled by Misclassification of All Clusters Wacharasak Siriseriwan; Krung Sinapiromsaran 2010 Third International Conference on Knowledge Discovery and Data Mining Year: 2010 pp. 220-223 IEEE Conference Publications.*

* cited by examiner

SYSTEMS AND METHODS FOR IMPROVED KNOWLEDGE MINING

PRIORITY CLAIM

This U.S. patent application claims priority under 35 U.S.C. §119 to: India Application No. 1424/CHE/2015, filed on Mar. 20, 2015. The entire contents of the aforementioned application are incorporated herein by reference.

DESCRIPTION

Technical Field

This disclosure relates generally to information processing, and more particularly to systems and methods for improved knowledge mining.

Background

The knowledge mining systems or frameworks available requires vast understanding of machine learning and data modelling to model the data and draw knowledge out of the data. Some of the advanced existing system uses a fall back approach to handle the problem of poor coverage of the classification. But, these available systems lacks a technique to automatically perform pre-data analysis in terms data distribution and recommendation of techniques that can be performed based on distribution of data which in turn leads to longer modelling cycle.

The existing mining systems require manual intervention for performing data sufficiency and data filtration technique for implementing knowledge mining. Also, the present systems cannot automatically evaluate whether the data clusters formed is correct or not and also is not able to test the lifecycle of the model. The available knowledge mining framework is also somewhat dis-integrated as it requires multiple human interventions to filter, extract, classify and thus extract valuable knowledge out of the data. There are time when existing system does requires lot of manual intervention with the help of analyst to extract valuable knowledge out of the data leading to larger analysis cycle For reporting purposes, the current scenario also requires management to understand the data distribution in a human understandable format which is often performed by analyst using the tools. Analysts currently must perform transactional work, rather than focusing on more productive work related to drawing conclusion out of the data. Also, with an increase in data with multiple folds year-on-year and limitation of resources in terms of man power, it is difficult to generate fast conclusions out of the data with higher precision and coverage. Also, at times, there may be a gap between the analyst and the management in terms of getting the right kind of report out of the data.

SUMMARY

Embodiments of the present disclosure may advantageously provide a system and a method of knowledge mining which can filter the insufficient data in order to improves the accuracy of the system in the later stages, and can test the accuracy of model and provide proper prediction of end-of-life of existing model, so that the number of modelling cycles can be reduced. Embodiments may also advantageously provide a system and a method of knowledge mining which can provide insights about the data in terms of frequency and time based analysis.

In one embodiment, a processor-implemented automated knowledge mining method is disclosed. The method comprises aggregating data encoded according to a plurality of data formats, and filtering the aggregated data using a combination of sliding-window and boundary-based filtration techniques to obtain filtered data. Further, the method includes applying machine learning and natural language processing to the filtered data to generate a business ontology. Also, the method includes identifying automatically, using a prediction analysis, one or more recommended classification techniques to apply to the filtered data, and clustering the filtered data into an automatically determined number of categories based on the automatically recommended one or more classification techniques. The one or more classification techniques may utilize iterative feedback between a supervised learning technique and an unsupervised learning technique. Furthermore, the method includes generating automatically correlations between the business ontology and the automatically determined number of categories, and generating a knowledge base using the correlations between the business ontology and the automatically determined number of categories.

In another embodiment, an automated knowledge mining system is disclosed, comprising one or more hardware processors, and one or more memory units storing instructions executable by the one or more hardware processors. When executed, the instructions cause the one or more hardware processors to perform a method. The method comprises aggregating data encoded according to a plurality of data formats, and filtering the aggregated data using a combination of sliding-window and boundary-based filtration techniques to obtain filtered data. Further, the method includes applying machine learning and natural language processing to the filtered data to generate a business ontology. Also, the method includes identifying automatically, using a prediction analysis, one or more recommended classification techniques to apply to the filtered data, and clustering the filtered data into an automatically determined number of categories based on the automatically recommended one or more classification techniques. The one or more classification techniques may utilize iterative feedback between a supervised learning technique and an unsupervised learning technique. Furthermore, the method includes generating automatically correlations between the business ontology and the automatically determined number of categories, and generating a knowledge base using the correlations between the business ontology and the automatically determined number of categories.

In yet another embodiment, a non-transitory computer-readable medium is disclosed, storing computer-executable automated knowledge mining instructions. When executed, the instructions cause the one or more hardware processors to perform a method. The method comprises aggregating data encoded according to a plurality of data formats, and filtering the aggregated data using a combination of sliding-window and boundary-based filtration techniques to obtain filtered data. Further, the method includes applying machine learning and natural language processing to the filtered data to generate a business ontology. Also, the method includes identifying automatically, using a prediction analysis, one or more recommended classification techniques to apply to the filtered data, and clustering the filtered data into an automatically determined number of categories based on the automatically recommended one or more classification techniques. The one or more classification techniques may utilize iterative feedback between a supervised learning technique and an unsupervised learning technique. Furthermore, the method includes generating automatically correlations between the business ontology and the automatically determined number of categories, and generating a knowledge base using the correlations between the business ontology and the automatically determined number of categories.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide improved methods and systems for knowledge mining. The disclosed embodiments may aggregate data encoded according to a plurality of data formats. The disclosed embodiments may filter the aggregated data using a combination of sliding-window and boundary-based filtration techniques to obtain filtered data. The disclosed embodiments may apply machine learning and natural language processing to the filtered data to generate refined data including a business ontology. The disclosed embodiments may identify automatically, using a prediction analysis, one or more recommended classification techniques to apply to the refined data, and then cluster the refined data into an automatically determined number of categories based on the automatically recommended one or more classification techniques, by utilizing iterative feedback between a supervised learning technique and an unsupervised learning technique. The disclosed embodiments may generate automatically correlations within the clustered data, and generating a knowledge base using the generated correlations within the clustered data.

Accordingly, it may be advantageous to provide methods and systems for improved knowledge mining. It may be advantageous to provide methods and systems for improved knowledge mining that can attain higher coverage and better classification of data which would result in useful insights about the data, and can lead to faster conclusion out of the data.

Figure 1:
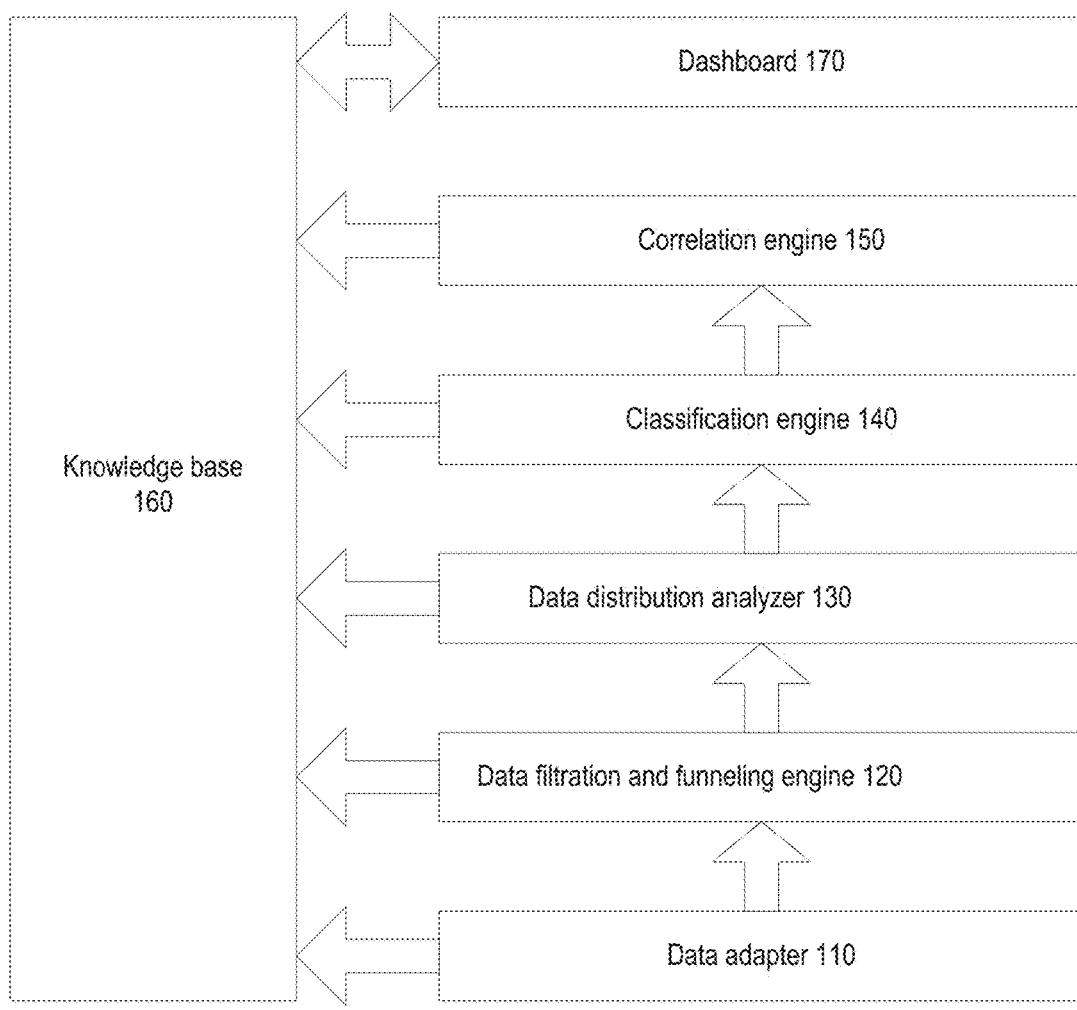
FIG. 1 illustrates an example system for knowledge mining according to some embodiments of the present disclosure.

FIG. 1 depicts an example knowledge mining system 100. Knowledge mining system 100 may include an data adapter 110, a data filtration and funneling engine 120, a data distribution analyzer 130, a classification engine 140, a correlation engine 150, a knowledge base 160, and a dashboard 170. It will be appreciated from this disclosure that the number and arrangement of these components is exemplary only and provided for purposes of illustration. Other arrangements and numbers of components may be utilized without departing from the teachings and embodiments of the present disclosure.

Data Adapter 110 may be configured to enable the user to collect data from different sources such as from a customer relationship management (CRM) database, and NoSQL stores, etc. The data collected can be of multiple formats of files including CSV and XML. As to be described below, data adapter 110 may be also configured to perform a first-level filtering analysis of the collected data, and provide the filtered data to data filtration and funneling engine 120. In some embodiment, the first-level filtering can be performed using a combination of sliding window and boundary based techniques. In some embodiments, data adapter 110 can also store the analysis information at knowledge base 160, and the analysis information can then be further analyzed later, as to be described below.

Data filtration and funneling engine 120 may be configured to perform a second-level filtering analysis of the filtered data provided by data adaptor 110. In some embodiments, the second-level filtering can be performed using techniques including topic modelling and natural language processing (NLP). After the second-level filtering is performed, data filtration and funneling engine 120 can then build or update an ontology using the result of the second-level filtering. The ontology may allow multiple-dimension analysis and customizable top-based funneling to be performed on the filtered data.

Data distribution analyzer 130 may be configured to perform further analysis on the filtered data provided by data filtration and funneling engine 120. In some embodiments, data distribution analyzer 130 may perform an analysis of the content of the filtered data, as well as the length, language, linguistic of the text included in the data. Data distribution analyzer 130 then may recommend the data distribution techniques that can be applied to extract knowledge out of the data, based on a result of the analysis.

Classification engine 140 may be configured to perform clustering and classification of the filtered data. In some embodiments, classification engine 108 may select one or more data distribution techniques from the recommended data distribution techniques provided by data distribution analyzer 130. The selection can be made based on the type of data distribution. Classification engine 140 can then perform a combination of unsupervised and supervised machine-learning techniques to perform classification of the data. In parallel or sequentially, classification engine 108 can also employ linguistic based techniques to create clusters of data based on topic extraction and correlation. The classified and clustered data may be then provided to correlation engine 150.

Correlation engine 150 may be configured to perform comprehension and filtration of classification result. In some embodiments, correlation engine 150 may create a multi-dimensional data aspect to correlate between clustered data and named entities. Correlation engine 150 can also perform further filtering to remove some of the granular information included in the data.

Knowledge base 160 may be configured to store analytical and transaction reports at different stages of the processing, collected from data adapter 110, data filtration and funneling engine 120, data distribution analyzer 130, classification engine 140, and correlation engine 150. Knowledge base 160 can perform analytical processing of the reports to aggregate the data and predict outliers and anomalies. In some embodiments, knowledge base 160 may also provide indexing to the analyzed data, and implement storage and security policies, to facilitate accessing of the data by a user. Knowledge base 160 can also include a scheduler to be configured to schedule a time to perform the collection and analysis of the data. The scheduling can be performed based on the volume and frequency of data. The scheduler is to be described in detail below.

Dashboard 170 may be configured to provide a visual representation of the data and knowledge extracted by the system, as stored in knowledge base 160. Dashboard 170 may also allow the user to customize the visual representation by, for example, querying on the data set and the result set at different stages of the processing.

Figure 2:
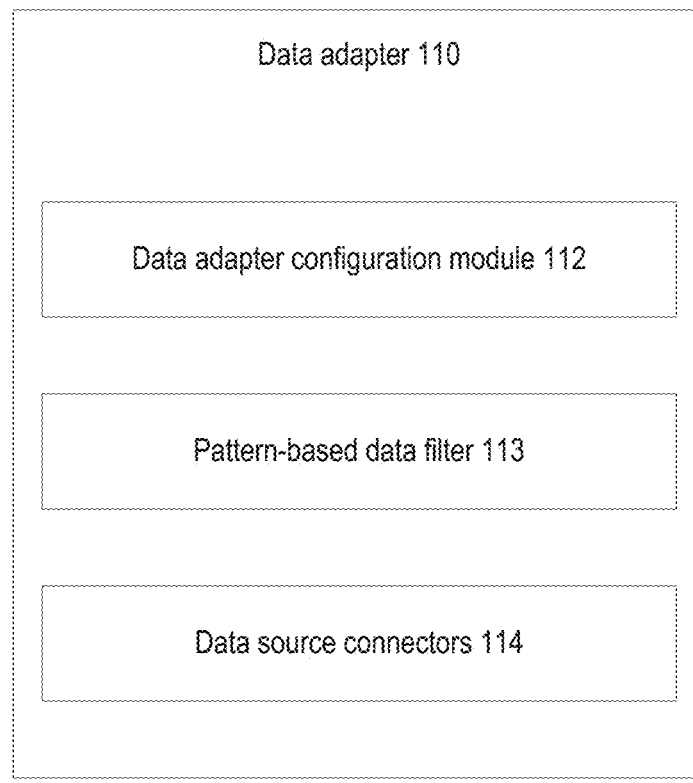
FIG. 2 is a functional block diagram of an example data adapter according to some embodiments of the present disclosure.

Reference is now made to FIG. 2, which illustrates a functional block diagram of data adapter 110 of FIG. 1. In some embodiments, as shown in FIG. 2, data adapter 110 may include a data adapter configuration module 112, a pattern-based data filter 113, and a data source connectors 114.

Data adapter configuration module 112 may allow a user to define one or more rules about when data is to be collected, and about the scope of the data to be collected, from various data sources. Data adapter configuration module 112 can also provide the rules to the scheduler of knowledge base 160, to synchronize with collection and analysis of the data.

Pattern-based data filter 113 may be configured to, using a combination of sliding window and boundary based techniques, detect both positive and negative patterns in the data. The pattern detection can be performed using NLP-based techniques, and can be configured individually for each data source. Pattern-based data filter 113 can then perform a first-level filtering of the data based on the detected patterns (e.g., by detecting and filtering based on a relevancy between the data and the patterns).

Data source connectors 114 may provide one or more interfaces (e.g., a software interface defined by library files) to various types of data sources. In some embodiments, the one or more interfaces can be configurable. For example, a script window can be provided, which may enable a user to write scripts to ingest data from various data sources (e.g., SQL and NoSQL data sources).

In some embodiments, data adapter 110 may be further configured to store configuration and analytic results at knowledge base 160. For example, the patterns detected by pattern-based data filter 113 can be stored in knowledge base 160. The analytic results can also be categorized according to, for example, each data sources. Such information can be useful. For example, a user can understand, from the information, which data source gives more relevant information, as reflected from the result of pattern-based data filter 113.

Figure 3:
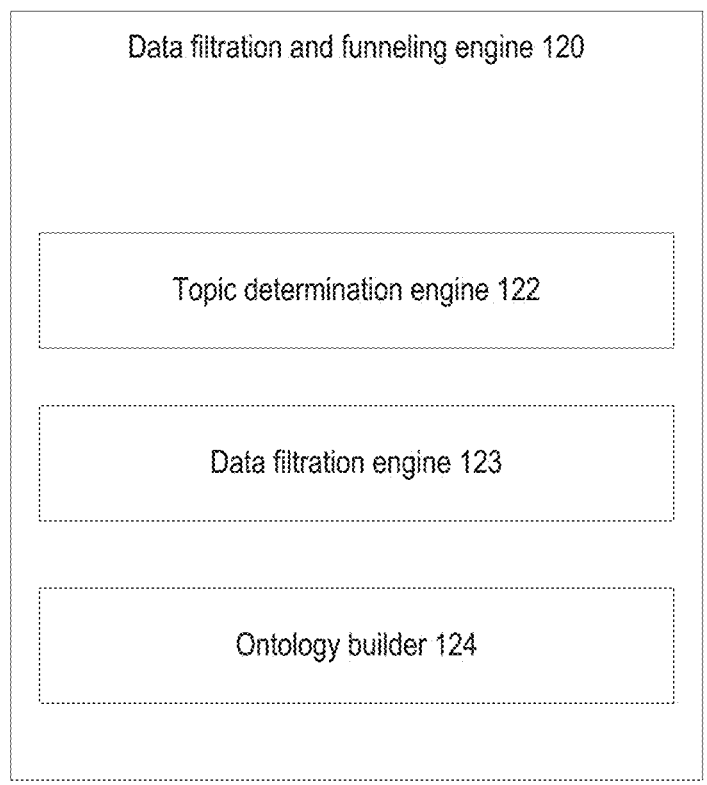
FIG. 3 is a functional block diagram of an example data filtration and funneling engine according to some embodiments of the present disclosure.

Reference is now made to FIG. 3, which illustrates a functional block diagram of data filtration and funneling engine 120 of FIG. 1. In some embodiments, as shown in FIG. 3, data filtration and funneling engine 120 may include a topic determination engine 122, a data filtration engine 123, and an ontology builder 124.

Topic determination engine 122 may be configured to, using topic modelling and NLP-based techniques, extract topics from the data. Based on the determined topics, data filtration engine 123 can perform a second-level of filtering of data, by calculating a correlation/association between the data and the extracted topics. In some embodiments, data filtration engine 123 can be configured to perform different kinds of second-level filtering with respect to different data sources. The filtering result can be used to predict the relevancy of data source. Such information can be useful for, for example, media and entertainment industry, who may wish to perform click source and traffic analysis. The relevancy information (e.g., whether a click leads to information relevant to a specific topic) can then be used to determine whether a particular Internet advertisement strategy meets certain a pre-defined goal (e.g., meeting certain cost-efficiency metrics).

Ontology builder 124 may be configured to build an ontology of the filtered data (after first-level and second-level filtering). In the ontology, the data can be associated with multiple dimensions, such as location, device, etc. The ontology can also provide a multiple-level funneling of the data by defining the breadth of accessible knowledge (e.g., as reflected by volume of data provided) as well as granularity (e.g., as reflected by the granularity of information provided) based on data distribution. Data filtration engine 123 can also be integrated into ontology builder 124, such that the relevancy of the knowledge extraction (as reflected by an output of data filtration engine 123) can change based on a selected funnel level. The ontology can be validated by domain experts.

In some embodiments, data filtration and funneling engine 120 may be further configured to store one or more analytical reports of the second-level filtering at knowledge base 160. Such reports can include, for example, what data are rejected as a result of the second-level filtering, the basis of rejection, as well as the methodology of the filtering (e.g., mathematic formulae that correlates relevancy of knowledge with increase in the selected funnel level). In some embodiments, data filtration and funneling engine 120 can also predict steep increase or decrease in data volume based on, for example, time and frequency of occurrence of such data coming from multiple sources. For example, data filtration and funneling engine 120 may have extracted a topic related to the launch of a first electronic device of company A, and the data relevant to the topic. Based on the time and frequency of occurrence of such data (e.g., a surge in data relevant to the first electronic device during the Thanksgiving shopping season in 2014), data filtration and funneling engine 120 can predict that the launch of a second electronic device by the same company, during the Thanksgiving shopping season in 2015, will lead to data that is similar in volume and relevancy being generated.

Figure 4:
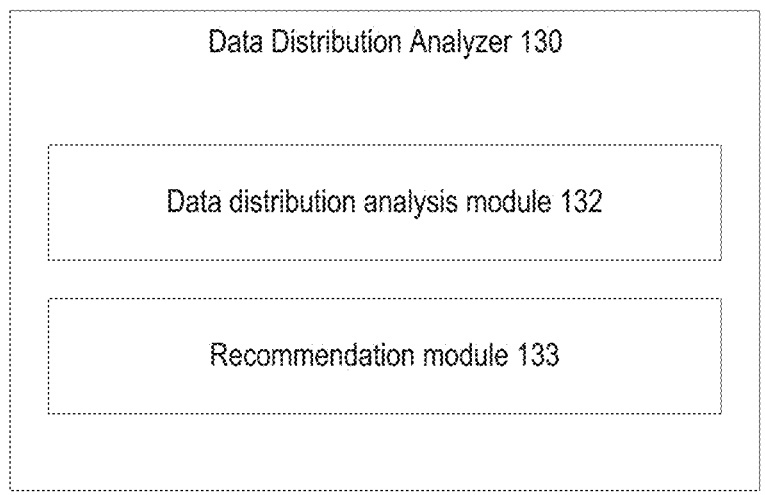
FIG. 4 is a functional block diagram of an example data distribution analyzer according to some embodiments of the present disclosure.

Reference is now made to FIG. 4, which illustrates a functional block diagram of data distribution analyzer 130 of FIG. 1. In some embodiments, as shown in FIG. 3, data distribution analyzer 130 may include a data distribution analysis module 132, and a recommendation module 133.

Data distribution analysis module 132 may analyze various aspects of the data, such as the content of data, length, language, linguistic of the text, etc. For example, data distribution analysis module 132 can detect different types of grammars and various language semantics, analyze the meaning of words and sentences, etc. Data distribution analysis module 132 can then determine the type of clustering and classification techniques based on a result of the analysis. In some embodiments, data distribution analysis module 132 can also determine and maintain a list of principles, which are high-level directions for determining a type of data distribution analysis. As an illustrative example, the list of principles can include using k-mean and nearest-neighbor methods for distance calculation when the data distribution is spherical or elliptical. The list of principles can be pre-loaded into the system, and can be updated with new principles to further improve the extraction of data. In some embodiments, data distribution analysis module 132 can also, as part of the analysis, estimate an amount of time to carry out the analysis. The estimation can be based on, for example, a size of the list of principles, the volume of data, etc.

Recommendation module 133 can provide a list of recommended clustering and classification techniques, as well as a result of analysis by data distribution analysis module 132. In some embodiments, the recommendation may be made not just based on execution time or accuracy, but based on a holistic consideration of all the attributes related to the analysis. In some embodiments, the recommended techniques and the analysis result can be sent automatically to, for example, classification engine 140 when the system is being operated in an auto-pilot mode. In some embodiments, the recommendation can be overridden by a user. In some embodiments, recommendation module 133 can also provide reports explaining why a particular clustering and classification technique (or a set of techniques) are recommended. The reports can also be stored in knowledge base 160.

Figure 5:
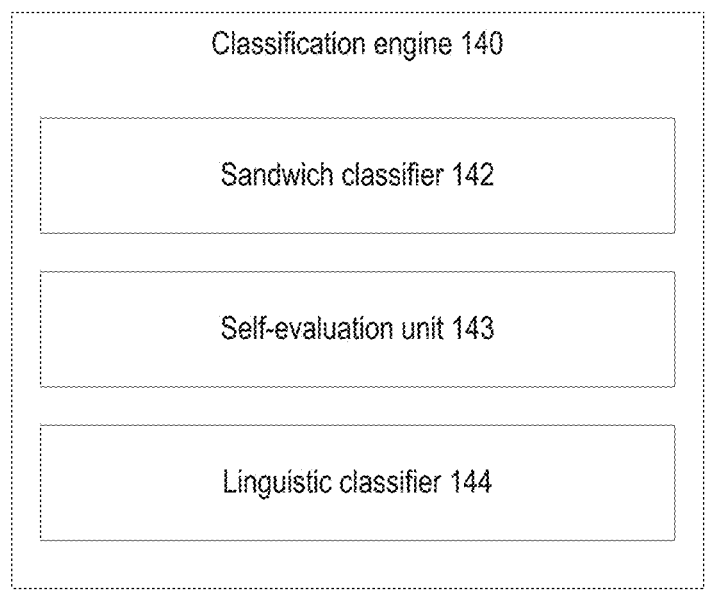
FIG. 5 is a functional block diagram of an example classification engine according to some embodiments of the present disclosure.

Reference is now made to FIG. 5, which illustrates a functional block diagram of classification engine 140 of FIG. 1. In some embodiments, as shown in FIG. 5, classification engine 140 may include a sandwich classifier 142, a self-evaluation unit 143, and a linguistic classifier 144.

Sandwich classifier 142 may be configured to carry out a conglomeration of unsupervised and supervised techniques to classify the data, based on the data distribution type information provided by data distribution analyzer 130. Unsupervised classification techniques include, for example, K-Means, Density-based spatial clustering of applications with noise (DBScan), Ordering points to identify the clustering structure (OPTICS), hierarchical clustering, estimation maximization, etc. While performing unsupervised knowledge mining, sandwich classifier can first determine, automatically, a number of categories. Various techniques can be used to determine the initial number of categories. For example, the initial number of categories can be estimated based on the number of items to be categorized. For example, a thumb rule technique $k \approx \sqrt{n/2}$ can be used for the estimation, where k represents the estimated number of categories, and n represents a number of items to be categorized. In some embodiments, silhouette plots and averages can also be used to determine the initial number of categories within a dataset. Based on the initial number of categories, sandwich classifier 142 can cluster the data and then perform classification based on the data distribution type and dataset. For example, if the data distribution is spherical (e.g., when plotted in a 3-D volume map with each of 3 categories forming an axis), clustering algorithms having spherical data distribution can be used. If the data distribution is more longitudinal in nature, Gaussian technique can be used.

The clustering and classification result can be fed to self-evaluation unit 143 as a training model, and the clustering and classification can be repeated with the number of categories increased, and a distribution curve of precision and recall values can be generated. The process can be iterated until a predetermined condition is detected. For example, after several iterations, if the distribution curve of precision and recall values becomes almost parallel with the x-axis, indicating that the values have become constant, sandwich classifier 142 may determine that the clustering is final, and stop the iteration. In some embodiments, sandwich classifier 142 can further improve the accuracy of classification by introducing further data massaging, filtering, and fine tuning of the classification, before the data is included in the training model.

In some embodiments, sandwich classifier 142 can iterate between supervised and unsupervised techniques to evaluate aforementioned training model. A percentage (e.g. 20%) of the data used in the model building can be marked, and then mixed with real-time data while performing unsupervised real-time classification. Sandwich classifier 142 can then use the classification and clustering result of the marked data to evaluate the training model. In some embodiments, a confusion matrix can be used to predict the precision and recall value of the classified data against a particular model.

As sandwich classifier 142 can iterate between supervised and unsupervised techniques, and performs self-evaluation to test the system's understanding about the real-time data, no prior training of the system may be required, and the accuracy and speed of the classification and clustering can be improved.

Classification engine 140 may also include linguistic classifier 144, which may be configured to operate in tandem with sandwich classifier 142, such that two classification models can be provided by classification engine 140. The two classification models can then be reconciled in the correlation engine. In some embodiments, linguistic classifier 144 may use NLP techniques to identify topics by detecting noun-forms associated with action speech that includes verbs and adjectives, to provide a more refined classification based on the identified topics. For example, the context in which the topics are associated with other can be considered during the classification process. Linguistic classifier 144 can then calculate correlation between other data and the classified topics using, for example, conditional probability model. Probability scores can be assigned to the data according to the calculated correlation, and the probability scores can be used to further filter the data to reject unwanted associations. The probability scores can also be associated with multiple verbs detected in multiple sentences, to further improve the accuracy of the correlation calculation.

Linguistic classifier 144 can also be configured to extract named entities. Together with the aforementioned extracted noun-forms and association with verb, linguistic classifier 144 can build a multi-dimensional cluster. For example, existing named entities and part-of-speech model with add-ons can be associated with action verbs under the multi-dimensional clusters. Through such associations, common mapping between the entities can also be determined. Such common mappings can provide more insight about the data.

Figure 6:
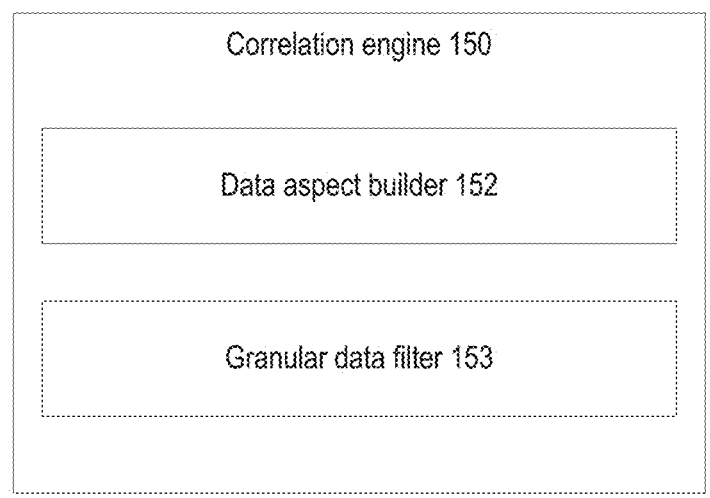
FIG. 6 is a functional block diagram of an example correlation engine according to some embodiments of the present disclosure.

Reference is now made to FIG. 6, which illustrates a functional block diagram of correlation engine 150 of FIG. 1. In some embodiments, as shown in FIG. 6, correlation engine 150 may include a multi-dimensional data aspect builder 152, and a granular data filter 153.

Data aspect builder 152 may be configured to build a data aspect with respect to the clustered data and the named entities provided by classification engine 140. In some embodiments, data aspect builder 152 can analyze, automatically, various attributes out of the named entities and the topics extracted by linguistic classifier 144. Such attribute can be, for example, location information. The attributes can be defined according to an attribute list, which data aspect builder 152 can use to perform the analysis. In some embodiments, the attribute list may be configurable, where users can add or remove attributes to vary the analysis.

After the attributes are analyzed, data aspect builder 152 can calculate a correlation between these attributes. Data aspect builder 152 can also build a multi-dimensional data aspect based on the calculated correlations, where the dimensions can represent an attributes space. Correlations calculated across different dimension may allow items that are facially unrelated to be correlated. For example, the phrases "Samsung note 3" and "Apple iPad" may have very little correlation based on, for example, the plain meaning of each phrases. But they can be correlated due to the fact that both are the brand name of a tablet.

Granular data filter 153 can be used to further filter out granular information, to remove data that are very specific (e.g., carries only single meaning) and do not possess sufficient attributes for correlation calculation. In some embodiments, the granular data removed can be used for other analysis, such as detection of abnormal data pattern, which can in turn indicate potential problems with the data collection. For example, after a launch of a very popular electronic product, granular data filter 153 may detect very little discussion over the Internet about the electronic product. Because of a lack of attributes in the discussion data, granular data filter 153 may filter the discussion data. Nevertheless, the discussion data can also be used to spot potential problems in data collection (e.g., whether data adapter 110 is configured properly).

Figure 7:
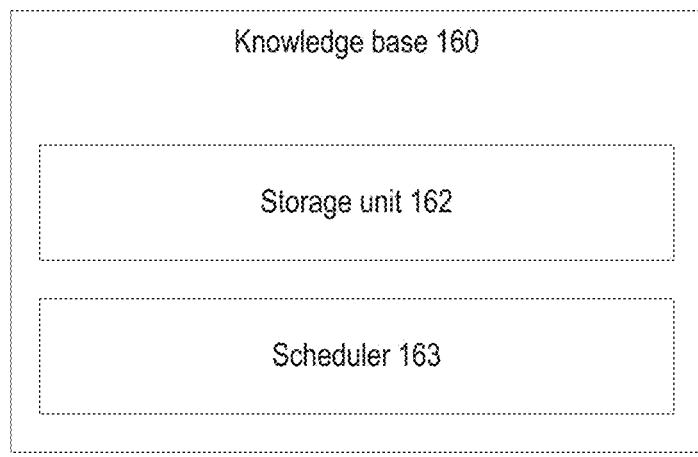
FIG. 7 is a functional block diagram of an example knowledge base according to some embodiments of the present disclosure.

Reference is now made to FIG. 7, which illustrates a functional block diagram of knowledge base 160 of FIG. 1. In some embodiments, as shown in FIG. 7, knowledge base 160 may include a scheduler 162 and a storage unit 163.

Scheduler 162 may be configured to control the operation of various components of system 100 to perform the analysis at a selected time and frequency. In some embodiments, the scheduling may be performed automatically based on the volume and frequency of data. In some embodiments, the scheduling can be overwritten by a user. Scheduler 162 can perform an aggregation of all the analytical and transaction reports provided by various components of system 100, such as configuration and analytic results of the first-level filtering provided by data adaptor 110, analytical reports of the second-level filtering provided by data filtration and funneling engine 120, and reports on recommended clustering and classification techniques provided by recommendation module 133. In some embodiments, after aggregation, scheduler 162 can also detect outliers and anomalies from the aggregated data, and report the detection to stakeholders.

In some embodiments, storage unit 163 may be a combination of both SQL based store and NoSQL based store. Storage unit 163 can be configured to store the data that has been classified, clustered, and filtered through data adaptor 110, data filtration and funneling engine 120, classification engine 140, and correlation engine 150. The data can then be provided to scheduler 162 for aggregation, or processed by other parts of system 100. In some embodiments, storage unit 163 may include an indexer to organize the stored data. In some embodiments, the indexer can associate the stored data with multiple attributes (e.g., topic, category, date of creation, etc.) to facilitate querying, analysis, and reporting of the stored data. The indexer can be distributive to allow greater scalability. In some embodiments, storage unit 163 also implements mechanisms for fail-over and security policies.

Figure 8:
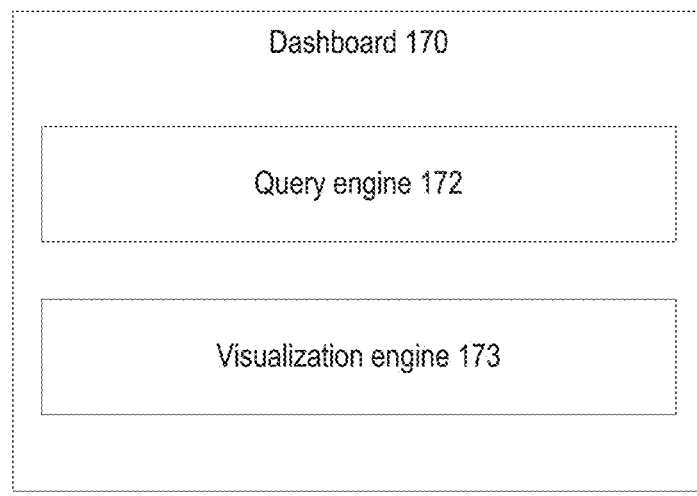
FIG. 8 is a functional block diagram of an example dashboard according to some embodiments of the present disclosure.

Reference is now made to FIG. 8, which illustrates a functional block diagram of dashboard 170 of FIG. 1. In some embodiments, as shown in FIG. 8, dashboard 170 may include a query engine 172 and a visualization engine 173.

Query engine 172 may be configured to allow a user to perform a search on the dataset and analytical result at various components of system 100 stored at knowledge base 160 including, for example, analytical reports of the first-level and second-level filtering, reports about recommended clustering and classification techniques provided by data distribution analyzer 130, the aggregated data provided by scheduler 162, etc. In some embodiments, query engine 172 may provide a user interface (e.g., a text-input box) which allows the user to create or customize the query. In some embodiments, query engine 172 may have access to a set of pre-calculated results associated with a set of predicted queries, and can respond to a user's query by determining a relationship between the user's query and the set of predicted queries. In some embodiments, the predicted queries (as well as the pre-calculated result) can also be associated with the indexer of storage unit 163. Such an arrangement can further improve the query response time of the system.

Visualization engine 173 may be configured to provide, through a graphical user interface, a representation of the dataset and the analytical result. The representation can be updated in response to the query provided by the user through query engine 172. In some embodiments, visualization engine 173 may provide a business intelligence dashboard which may enable the user to visual the data with random dimensions and measures. In some embodiments, visualization engine 173 may enable the user to export the dataset and the analytical result, and to send the exported data to stakeholders electronically. In some embodiments, visualization engine 173 may further include an alert panel to display alerts about potential problems with the data collection, as indicated by granular data filter 153.

Figure 9:
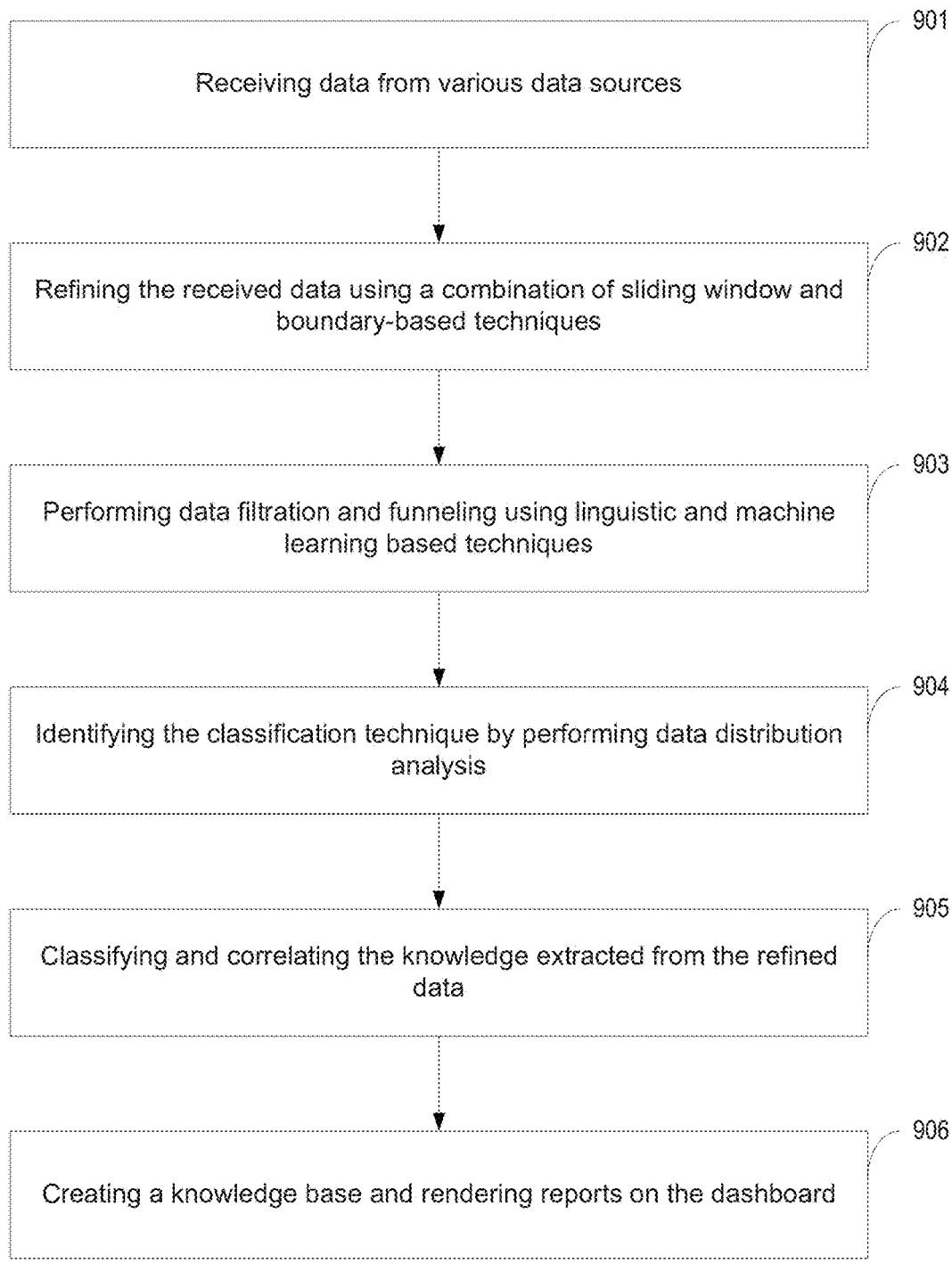
FIG. 9 is a flowchart illustrating an example method for knowledge mining according to some embodiments of the present disclosure.

FIG. 9 depicts a flowchart of an example method 900, consistent with some embodiments and aspects of the present disclosure. Method 900 may be implemented, for example, for knowledge mining. In some embodiments, method 900 may be implemented as one or more computer programs executed by one or more processors. Moreover, in some embodiments, method 900 may be implemented by a knowledge mining system (e.g., knowledge mining system 100) having one or more processors executing one or more computer programs stored on a non-transitory computer readable medium.

In some embodiments, example method 900 may include receiving data from various data sources at 901, and refining the received data using a combination of sliding window and boundary-based techniques at 902. For example, at 901, data Adapter 110 of FIG. 2 may collect data from different sources such as from CRM database, and NoSQL stores, etc. The data collected can be of multiple formats of files including CSV and XML. At 902, pattern-based data filter 112 of data adapter 110 can use a combination of sliding window and boundary based techniques to detect both positive and negative patterns, and then perform a first-level filtering of the data based on the detected patterns.

In some embodiments, example method 900 may include performing data filtration and funneling using linguistic and machine learning based techniques at 903. For example, at 903, topic determination engine 122 of FIG. 3 may use topic modelling and NLP-based techniques to extract topics from the data. Based on the determined topics, data filtration engine 123 of FIG. 3 may perform a second-level of filtering of data, by calculating a correlation/association between the data and the extracted topics. Ontology builder 124 of FIG. 3 can also build an ontology of the filtered data (after first-level and second-level filtering). In the ontology, the filtered data can be associated with multiple dimensions, such as location, device, etc. In some embodiments, step 903 may further comprise generating one or more analytical reports of the second-level filtering. The analytical reports can include, for example, the basis of rejecting certain data under the second-level filtering.

In some embodiments, example method 900 may include identifying the classification technique by performing data distribution analysis at 904. For example, at 904, data distribution analysis module 132 of FIG. 4 may analyze various aspects of the data, such as the content of data, length, language, linguistic of the text, etc., and then determine the type of clustering and classification techniques based on a result of the analysis. Recommendation module 133 of FIG. 4 can also provide a list of recommended clustering and classification techniques, as well as a result of analysis by data distribution analysis module 132. The recommendation may be made not just based on execution time or accuracy, but based on a holistic consideration of all the attributes related to the analysis.

In some embodiments, example method 900 may include classifying and correlating the knowledge extracted from the refined data at 905. For example, at 905, sandwich classifier 142 of FIG. 5 may carry out a conglomeration of unsupervised and supervised techniques to classify the data, based on the data distribution type information provided by data distribution analyzer 130. While performing unsupervised knowledge mining, sandwich classifier can select, automatically, the number of categories, which can be finalized after multiple iterations. Based on the selected number of categories, sandwich classifier 142 can cluster the data and then perform classification based on the data distribution type and dataset. For example, if the data distribution is spherical (e.g., as visualized on a 3-D map of the data along three classifications as axes), clustering algorithms having spherical data distribution can be used. If the data distribution is more longitudinal in nature, Gaussian technique can be used. The clustering and classification result can be fed to self-evaluation unit 143 of FIG. 5 as a training model, and the clustering and classification can be iterated until a predetermined condition is detected. Sandwich classifier 142 can further improve the accuracy of classification by introducing further data massaging, filtering, and fine tuning of the classification, before the data is included in the training model. Sandwich classifier 142 can also iterate between supervised and unsupervised techniques to evaluate aforementioned training model. A percentage (e.g. 20%) of the data used in the model building can be marked, and then mixed with real-time data while performing unsupervised real-time classification. Sandwich classifier 142 can then use the classification and clustering result of the marked data to evaluate the training model.

At 905, linguistic classifier 144 of FIG. 5 also may create a linguistic-based classification model. Linguistic classifier 144 may use NLP techniques to identify topics by detecting noun-forms associated with action speech that includes verbs and adjectives, and then calculate correlation between the data and the classified topics using conditional probability model. Linguistic classifier 144 can also extract named entities, and build a multi-dimensional cluster using the extracted named entities and part-of-speech models.

At 905, correlation engine 150 of FIG. 1 also may correlate the classified data. For example, data aspect builder 152 of FIG. 5 extract attributes from the data, calculates a correlation between these attributes, and then builds a multi-dimensional data aspect with respect to different clusters and named entities based on the calculated correlations. Granular data filter 153 can also filter out granular information to remove data that do not possess sufficient attributes. The filtered out granular information can be used to spot potent problems in data collection.

In some embodiments, example method 900 may include creating a knowledge base and rendering reports on the dashboard at 906. For example, storage unit 163 of FIG. 7 may store the data that has been classified, clustered, and filtered through various steps of method 900. Scheduler 162 of FIG. 7 may perform the aggregation of data at a scheduled time. The scheduling can be performed automatically based on the volume and frequency of data. Scheduler 162 can also detect the outliers and anomalies in the aggregated data, and report the data to stakeholders. At 906, dashboard 170 also may provide a visual representation of the dataset and the analytical result, as well as other information including, for example, steps and criteria used for the filtering.

Computer System

Figure 10:
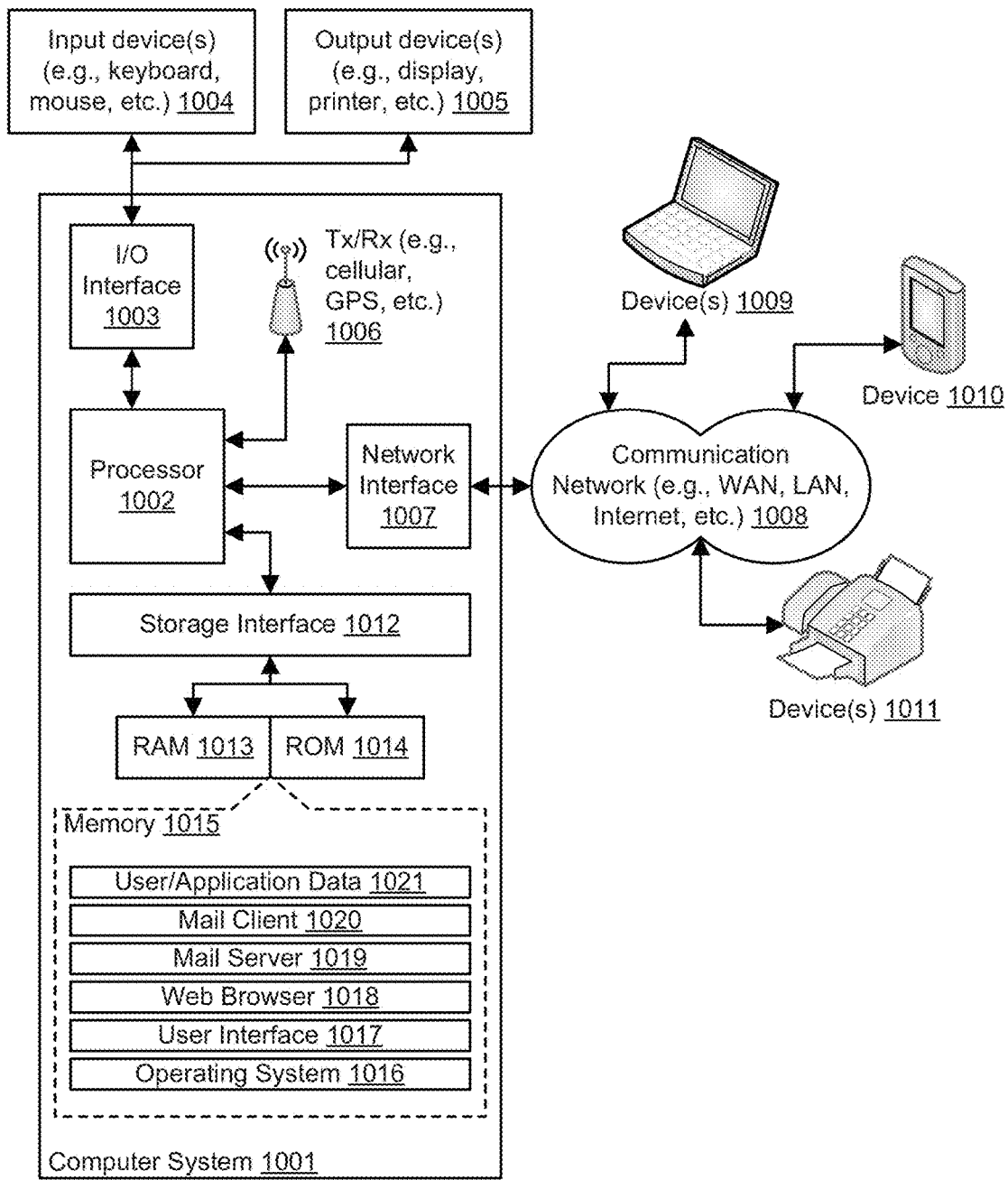
FIG. 10 is a block diagram of an example computer system for implementing embodiments consistent with the present disclosure.

FIG. 10 is a block diagram of an exemplary computer system for implementing embodiments consistent with the present disclosure. Variations of computer system 1001 may be used for implementing, for example, data adaptor 110, data filtration and funneling engine 120, data distribution analyzer 130, classification engine 140, correlation engine 150, and dashboard 170 of FIG. 1. Computer system 1001 may comprise a central processing unit ("CPU" or "processor") 1002. Processor 1002 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 1002 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1002 may be disposed in communication with one or more input/output (I/O) devices via I/O interface 1003. The I/O interface 1003 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1003, the computer system 1001 may communicate with one or more I/O devices. For example, the input device 1004 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 1005 may be a printer, fax machine, video display (e.g., cathode ray tube (CRT), liquid crystal display (LCD), light-emitting diode (LED), plasma, or the like), audio speaker, etc. In some embodiments, a transceiver 1006 may be disposed in connection with the processor 1002. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 1002 may be disposed in communication with a communication network 1008 via a network interface 1007. The network interface 1007 may communicate with the communication network 1008. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1008 may include, without limitation, a direct interconnection, local area network (LAN), wide area network (WAN), wireless network (e.g., using Wireless Application Protocol), the Internet, etc. Using the network interface 1007 and the communication network 1008, the computer system 1001 may communicate with devices 1010, 1011, and 1012. These devices may include, without limitation, personal computer (s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 1001 may itself embody one or more of these devices.

In some embodiments, the processor 1002 may be disposed in communication with one or more memory devices (e.g., RAM 1013, ROM 1014, etc.) via a storage interface 1012. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, knowledge base 160 of FIG. 1.

The memory devices may store a collection of program or database components, including, without limitation, an operating system 1016, user interface application 1017, web browser 1018, mail server 1019, mail client 1020, user/application data 1021 (e.g., any data variables or data records discussed in this disclosure), etc. The operating system 1016 may facilitate resource management and operation of the computer system 1001. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1017 may facilitate display, execution, interaction, manipulation, or operation of program components through textual or graphical facilities. For example, user interfaces may provide computer interaction interface elements on a display system operatively connected to the computer system 1001, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 1001 may implement a web browser 1018 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 1001 may implement a mail server 1019 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 1001 may implement a mail client 1020 stored program component. The mail client may be a mail viewing application, such as Apple Mail, Microsoft Entourage, Microsoft Outlook, Mozilla Thunderbird, etc.

In some embodiments, computer system 1001 may store user/application data 1021, such as the data, variables, records, etc. (e.g., configuration and analytic results of the first-level filtering provided by data adaptor 110, analytical reports of the second-level filtering provided by data filtration and funneling engine 120, and reports on recommended clustering and classification techniques provided by recommendation module 133, etc.) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described system and a method for improved knowledge mining. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented automated knowledge mining method, comprising:
   aggregating, via one or more hardware processors, data encoded according to a plurality of data formats;
   filtering, via the one or more hardware processors, the aggregated data using a combination of sliding-window and boundary-based filtration techniques to obtain filtered data;
   applying, via the one or more hardware processors, machine learning and natural language processing to the filtered data to generate a business ontology;
   identifying automatically, via the one or more hardware processors, using a prediction analysis, one or more recommended classification techniques to apply to the filtered data;
   clustering, via the one or more hardware processors, the filtered data into an automatically determined number of categories based on the automatically recommended one or more classification techniques;
   wherein the one or more classification techniques utilize iterative feedback between a supervised learning technique and an unsupervised learning technique;
   generating automatically, via the one or more hardware processors, correlations between the business ontology and the automatically determined number of categories; and
   generating, via the one or more hardware processors, a knowledge base using the correlations between the business ontology and the automatically determined number of categories.

2. The method of claim 1, further comprising:
   generating, via the one or more hardware processors, a hierarchical relationship between the categories and clustered data that is clustered within the categories.

3. The method of claim 1, further comprising:
   detecting, via the one or more hardware processors, one or more key terms using a natural language processing technique; and
   generating an observation regarding the aggregated data using the detected one or more key terms.

4. The method of claim 3, further comprising:
   detecting, via the one or more hardware processors, an anomaly in the aggregated data based on the generated observation.

5. The method of claim 1, wherein filtering the aggregated data includes performing a combined time-frequency traffic analysis of the aggregated data.

6. The method of claim 1, wherein clustering the filtered data includes testing accuracy of the automatically recommended one or more classification techniques.

7. The method of claim 1, wherein clustering is performed without use of any training related to the automatically recommended one or more classification techniques.

8. The method of claim 1, wherein a number of iterations for the iterative feedback between the supervised learning technique and the unsupervised learning technique is based on a precision and a recall value associated with clustered data that is clustered within the categories.

9. An automated knowledge mining system, comprising:
   one or more hardware processors; and
   one or more memory units storing instructions executable by the one or more hardware processors for:
      aggregating data encoded according to a plurality of data formats;
      filtering the aggregated data using a combination of sliding-window and boundary-based filtration techniques to obtain filtered data;
      applying machine learning and natural language processing to the filtered data to generate a business ontology;
      identifying automatically, using a prediction analysis, one or more recommended classification techniques to apply to the filtered data;

clustering the filtered data into an automatically determined number of categories based on the automatically recommended one or more classification techniques;
wherein the one or more classification techniques utilize iterative feedback between a supervised learning technique and an unsupervised learning technique;
generating automatically correlations between the business ontology and the automatically determined number of categories; and
generating a knowledge base using the correlations between the business ontology and the automatically determined number of categories.

10. The system of claim 9, further storing instructions for:
generating a hierarchical relationship between the categories and clustered data that is clustered within the categories.

11. The system of claim 9, further storing instructions for:
detecting one or more key terms using a natural language processing technique; and
generating an observation regarding the aggregated data using the detected one or more key terms.

12. The system of claim 11, further storing instructions for:
detecting an anomaly in the aggregated data based on the generated observation.

13. The system of claim 9, wherein filtering the aggregated data includes performing a combined time-frequency traffic analysis of the aggregated data.

14. The system of claim 9, wherein clustering the filtered data includes testing accuracy of the automatically recommended one or more classification techniques.

15. The system of claim 9, wherein clustering is performed without use of any training related to the automatically recommended one or more classification techniques.

16. The system of claim 9, wherein a number of iterations for the iterative feedback between the supervised learning technique and the unsupervised learning technique is based on a precision and a recall value associated with clustered data that is clustered within the categories.

17. A non-transitory computer-readable medium storing computer-executable automated knowledge mining instructions comprising instructions for:
aggregating data encoded according to a plurality of data formats;
filtering the aggregated data using a combination of sliding-window and boundary-based filtration techniques to obtain filtered data;
applying machine learning and natural language processing to the filtered data to generate a business ontology;
identifying automatically, using a prediction analysis, one or more recommended classification techniques to apply to the filtered data;
clustering the filtered data into an automatically determined number of categories based on the automatically recommended one or more classification techniques;
wherein the one or more classification techniques utilize iterative feedback between a supervised learning technique and an unsupervised learning technique;
generating automatically correlations between the business ontology and the automatically determined number of categories; and
generating a knowledge base using the correlations between the business ontology and the automatically determined number of categories.

18. The medium of claim 17, further storing instructions for:
generating a hierarchical relationship between the categories and clustered data that is clustered within the categories.

19. The medium of claim 17, further storing instructions for:
detecting one or more key terms using a natural language processing technique; and
generating an observation regarding the aggregated data using the detected one or more key terms.

20. The medium of claim 19, further storing instructions for:
detecting an anomaly in the aggregated data based on the generated observation.

* * * * *